United States Patent
Koase

(10) Patent No.: US 10,549,717 B2
(45) Date of Patent: Feb. 4, 2020

(54) SEAT BELT WEARING ENCOURAGEMENT APPARATUS

(71) Applicant: TOYOTA JIDOSHA KABUSHIKI KAISHA, Toyota-shi (JP)

(72) Inventor: Takenori Koase, Miyoshi (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 87 days.

(21) Appl. No.: 15/861,135

(22) Filed: Jan. 3, 2018

(65) Prior Publication Data
US 2018/0222441 A1     Aug. 9, 2018

(30) Foreign Application Priority Data

Feb. 3, 2017  (JP) ................................. 2017-018817

(51) Int. Cl.
*B60R 22/48*  (2006.01)

(52) U.S. Cl.
CPC ...... *B60R 22/48* (2013.01); *B60R 2022/4816* (2013.01); *B60R 2022/4825* (2013.01); *B60R 2022/4858* (2013.01); *B60R 2022/4866* (2013.01); *B60R 2022/4891* (2013.01)

(58) Field of Classification Search
CPC ............ B60R 22/48; B60R 2022/4891; B60R 2022/4866; B60R 2022/4816; B60R 2022/4858; B60R 2022/4825
See application file for complete search history.

(56) References Cited

U.S. PATENT DOCUMENTS

| 4,885,566 A | * | 12/1989 | Aoki | B60R 22/48 340/457.1 |
| 6,260,650 B1 | * | 7/2001 | Gustavsson | B60K 28/04 180/268 |
| 7,686,119 B2 | * | 3/2010 | Greene | B60R 22/48 180/268 |
| 8,464,824 B1 | * | 6/2013 | Reisenberger | B60K 28/10 180/268 |
| 8,548,710 B1 | * | 10/2013 | Reisenberger | B60K 28/04 180/268 |
| 2019/0111889 A1 | * | 4/2019 | Michalke | B60R 21/01566 |

FOREIGN PATENT DOCUMENTS

| JP | 61-184131 | 8/1986 |
| JP | 6-263008 | 9/1994 |
| JP | 7-251711 | 10/1995 |

\* cited by examiner

*Primary Examiner* — Drew J Brown
(74) *Attorney, Agent, or Firm* — Oblon, McClelland, Maier & Neustadt, L.L.P.

(57) ABSTRACT

A seat belt wearing encouragement apparatus includes a wearing state detecting unit to detect a wearing state of a seat belt; a wearing determination unit to determine whether the seat belt is worn, based on the wearing state; a vehicle speed detecting unit to detect a vehicle speed of the vehicle; a warning unit to warn the passenger; a warning command unit to issue a command to the warning unit to execute warning if the vehicle speed detecting unit has detected the vehicle speed exceeding a setting speed, and the wearing determination unit has determined that the seat belt is not being worn properly; and a vehicle speed limiting unit to limit the vehicle speed in a case where even after a predetermined time has elapsed since the warning was executed, the wearing determination unit still determines that the seat belt is not being worn properly.

18 Claims, 6 Drawing Sheets

FIG.2

| | | | | | | | | | | |
|---|---|---|---|---|---|---|---|---|---|---|
| INPUT | 1 | PASSENGER DETECTION | ON | OFF | ON | ON | ON | ON | OFF | OFF |
| | 2 | BELT EXTENSION | ON | OFF | OFF | ON | ON | OFF | ON | OFF |
| | 3 | BUCKLE | ON | OFF | OFF | OFF | OFF | ON | OFF | ON |
| | 4 | VEHICLE SPEED FLAG | — | — | — | 0 | 1 | — | — | — |
| OUTPUT | | Fc | 7 | 0 | 1 | 2 | 2 | 3 | 4 | 5 | 6 |

| A | B |
|---|---|
| Maximum Speed Limited to AA km/h Until Your Seat Belt is Buckled!   | |

| C | D |
|---|---|
| Improper Seat Belt Use Detected Please Wear Your Seatbelt Properly!   | Maximum Speed will be AA km/h in BB seconds Please Buckle Your Seat Belt!  BB sec  |

| E | F |
|---|---|
| Maximum Speed is AA km/h Please Buckle Your Seat Belt!   | Release Gas Pedal to Regain Control   |

SEAT BELT WEARING ENCOURAGEMENT APPARATUS

CROSS-REFERENCE TO RELATED APPLICATIONS

This application is based upon and claims the benefit of priority of the prior Japanese Priority Application No. 2017-018817 filed on Feb. 3, 2017, the entire contents of which are hereby incorporated by reference.

FIELD

The present disclosure relates to a seat belt wearing encouragement apparatus.

BACKGROUND

Conventionally, a seat belt wearing encouragement apparatus has been known that is used for a vehicle if traveling in a state where a seat belt is not being worn, to output a predetermined warning message, and to limit the vehicle speed (see, for example, Patent document 1).

Related-Art Documents

Patent Documents

Patent Document 1: Japanese Laid-Open Patent Application No. H6-263008

However, the conventional technology limits the vehicle speed immediately after having output the predetermined warning message as long as the vehicle speed is greater than or equal to a predetermined speed limit. Therefore, if a passenger tries to put on the seat belt in response to receiving the warning message, it is highly likely that the vehicle speed will have already been limited by the time the passenger finishes putting on the seat belt.

Thereupon, an embodiment in the present disclosure has an object to provide a seat belt wearing encouragement apparatus that can reduce a possibility that the vehicle speed is limited before the passenger will have put on the seat belt after having received a warning message.

SUMMARY

In order to achieve the above object, in a first aspect in the present disclosure, a seat belt wearing encouragement apparatus is provided that includes a wearing state detecting unit configured to detect a wearing state of a seat belt for restraining a passenger of a vehicle; a wearing determination unit configured to determine whether the seat belt is worn, based on the wearing state detected by the wearing state detecting unit; a vehicle speed detecting unit configured to detect a vehicle speed of the vehicle; a warning unit configured to warn the passenger; a warning command unit configured to issue a command to the warning unit to execute warning in a case where the vehicle speed detecting unit has detected the vehicle speed exceeding a setting speed, and the wearing determination unit has determined that the seat belt is not being worn properly; and a vehicle speed limiting unit configured to limit the vehicle speed in a case where even after a predetermined time has elapsed since the warning was executed, the wearing determination unit still determines that the seat belt is not being worn properly.

According to this aspect, if the vehicle speed detecting unit has detected the vehicle speed exceeding the setting speed, and the wearing determination unit has determined that the seat belt is not being worn properly, a warning is executed to the passenger. Also, the predetermined time is provided after the warning has been executed. Therefore, a time is secured for the passenger to put on the seat belt properly after the passenger has received the warning and before the vehicle speed is to be limited. This can reduce a possibility that the vehicle speed is limited after the passenger has received the warning and before the passenger can put on the seat belt properly.

Also, in this aspect, the wearing state detecting unit may include a seating detecting unit configured to detect seating of the passenger; and an engagement detecting unit configured to detect engagement between a tongue attached to the seat belt and a buckle attached to a seat, wherein the wearing determination unit determines that the seat belt is not being worn properly in a case where a state previous to a state in which the seating and the engagement are detected, is a state in which the seating was not detected and the engagement was detected.

If a state previous to a state in which the seating and the engagement are detected, is a state in which the seating was not detected and the engagement was detected, then, it is possible to consider that the seat belt has not been put on in accordance with a proper procedure. This is because it is not normally conceivable that the seating is detected after the engagement has been detected. Therefore, according to this aspect, it is possible to correctly determine that the seat belt has not been put on in accordance with the proper procedure, by the wearing determination unit. In this way, the seat belt is determined as not put on properly if the seat belt has not been put on in accordance with the proper procedure. Therefore, if the vehicle speed exceeds the setting speed, a warning is executed to the passenger. Therefore, it is possible to encourage the passenger not wearing the seat belt in accordance with the proper procedure, to put on the seat belt in accordance with the proper procedure.

Also, in this aspect, the wearing state detecting unit may include a seating detecting unit configured to detect seating of the passenger; an extension detecting unit configured to detect an extension of the seat belt; and an engagement detecting unit configured to detect engagement between a tongue attached to the seat belt and a buckle attached to a seat, wherein the wearing determination unit determines that the seat belt is not being worn properly in a case of having determined that the seat belt has not been put on in accordance with a proper procedure, based on a timing at which the seating was detected by the seating detecting unit, a timing at which the extension was detected by the extension detecting unit, and a timing at which the engagement was detected by the engagement detecting unit.

According to this aspect, the seat belt is determined as not put on properly if the seat belt has not been put on in accordance with the proper procedure. Therefore, if the vehicle speed exceeds the setting speed, a warning is executed to the passenger. Therefore, it is possible to encourage the passenger not wearing the seat belt in accordance with the proper procedure, to put on the seat belt in accordance with the proper procedure.

Also, in this aspect, the wearing determination unit may determine that the seat belt is not being worn properly in a case where a state previous to a state in which the seating, the extension, and the engagement are detected, is a state in which the seating was not detected and at least one of the extension and the engagement was detected, or is a state in which the extension was not detected and the seating and the engagement were detected.

According to this aspect, it is possible to correctly determine that the seat belt has not been put on in accordance with the proper procedure. This is because it is not normally conceivable that the seating is detected after at least one of the extension and the engagement has been detected, and it is not normally conceivable that the extension is detected after the seating and the engagement have been detected.

Also, in this aspect, the vehicle speed limiting unit may release limiting the vehicle speed in a case where at least one of an occurrence of determination made by the wearing determination unit that the seat belt is being worn properly, and an occurrence of detection made by the vehicle speed detecting unit that the vehicle speed is less than or equal to the setting speed, happens before the predetermined time elapses.

According to this aspect, it is possible to avoid a limited vehicle speed before limiting of the vehicle speed has started, and hence, it is possible to reduce troublesomeness felt by the passenger due to the limited vehicle speed. Note that "an occurrence of determination made by the wearing determination unit that the seat belt is being worn properly" may be interpreted synonymously with "no occurrence of determination made by the wearing determination unit that the seat belt is not being worn properly".

Also, in order to achieve the above object, in a second aspect in the present disclosure, a seat belt wearing encouragement apparatus is provided that includes a wearing state detecting unit configured to detect a wearing state of a seat belt for restraining a passenger of a vehicle; a wearing determination unit configured to determine whether the seat belt is worn, based on the wearing state detected by the wearing state detecting unit; a vehicle speed detecting unit configured to detect a vehicle speed of the vehicle; a warning unit configured to warn the passenger; a warning command unit configured to issue a command to the warning unit to execute warning in a case where the vehicle speed detecting unit has detected the vehicle speed exceeding a setting speed, and the wearing determination unit has determined that the seat belt is not being worn; and a vehicle speed limiting unit configured to limit the vehicle speed in a case where even after a predetermined time has elapsed since the warning was executed, the wearing determination unit still determines that the seat belt is not being worn.

According to this aspect, if the vehicle speed detecting unit has detected the vehicle speed exceeding the setting speed, and the wearing determination unit has determined that the seat belt is not being worn, a warning is executed to the passenger. Also, the predetermined time is provided after the warning has been executed. Therefore, a time is secured for the passenger to put on the seat belt after the passenger has received the warning and before the vehicle speed is to be limited. This can reduce a possibility that the vehicle speed is limited after the passenger has received the warning and before the passenger finishes putting on the seat belt.

Also, in this aspect, the vehicle speed limiting unit may release limiting the vehicle speed in a case where at least one of an occurrence of determination made by the wearing determination unit that the seat belt is worn, and an occurrence of detection made by the vehicle speed detecting unit that the vehicle speed is less than or equal to the setting speed, happens before the predetermined time elapses.

According to this aspect, it is possible to avoid a limited vehicle speed before limiting of the vehicle speed has started, and hence, it is possible to reduce troublesomeness felt by the passenger due to the limited vehicle speed. Note that "an occurrence of determination made by the wearing determination unit that the seat belt is worn" may be interpreted synonymously with "no occurrence of determination made by the wearing determination unit that the seat belt is not being worn".

Also, in each aspect in the present disclosure, the warning unit may display on a display unit a remaining time until limiting the vehicle speed becomes effective, before the predetermined time will have elapsed since the warning was executed.

According to this aspect, it is possible to make the passenger visually recognize how much time is left until the vehicle speed is to be limited (the passenger can visually confirm the time until the vehicle speed is to be limited).

Also, in each aspect in the present disclosure, the warning unit may display on a display unit an upper speed limit to be imposed when limiting the vehicle speed becomes effective, before the predetermined time will have elapsed since the warning was executed.

According to this aspect, it is possible to make the passenger visually recognize what upper speed limit will be imposed before limiting of the vehicle speed has started (the passenger can visually confirm the upper speed limit to be imposed when limiting the vehicle speed becomes effective).

Also, in each aspect in the present disclosure, the vehicle speed limiting unit may limit the vehicle speed, by limiting reception of an accelerator pedal operation performed by the passenger.

According to this aspect, limiting reception of an accelerator pedal operation performed by the passenger limits acceleration of the vehicle, and thereby, can limit the vehicle speed. Therefore, acceleration of the vehicle is limited even if the passenger operates the accelerator pedal, which may further effectively encourage the passenger to put on the seat belt properly.

According to an aspect in the present disclosure, it is possible to reduce a possibility that the vehicle speed is to be limited after the passenger has received a warning before wearing the seat belt.

BRIEF DESCRIPTION OF DRAWINGS

FIG. 2 is a diagram illustrating a list of combinations of states detected by a wearing state detecting unit;

DESCRIPTION OF EMBODIMENTS

In the following, a seat belt wearing encouragement apparatus related to embodiments will be described with reference to the drawings.

Figure 1:
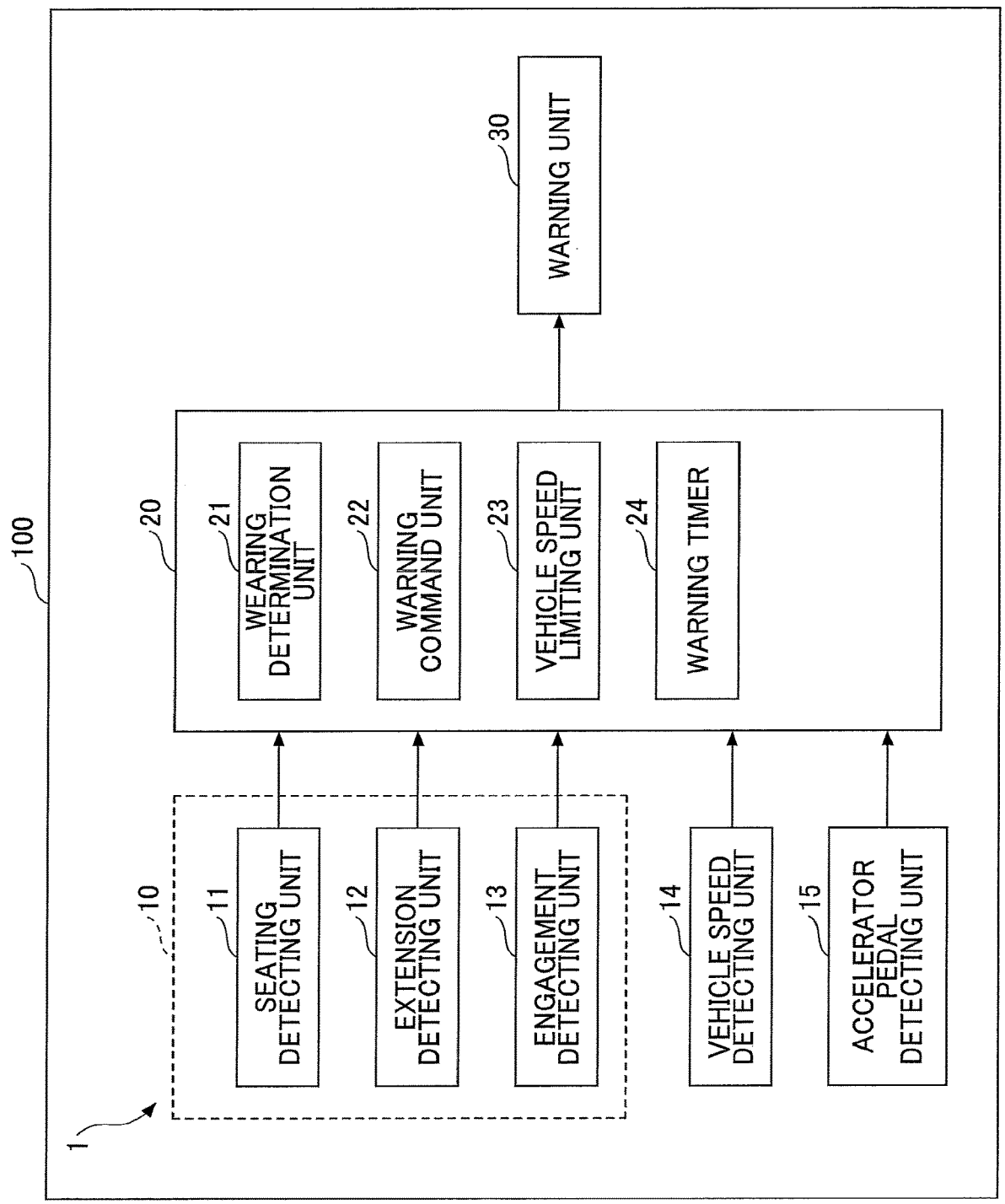
FIG. 1 is a diagram illustrating an example of a configuration of a seat belt wearing encouragement apparatus related to an embodiment.

FIG. 1 is a diagram illustrating an example of a configuration of a seat belt wearing encouragement apparatus 1 related to an embodiment. The seat belt wearing encouragement apparatus 1 illustrated in FIG. 1 is installed in a vehicle 100. The seat belt wearing encouragement apparatus 1 is an interlock device that reminds a passenger in the vehicle 100 who is not wearing the seat belt properly, to put on the seat belt, and for such a passenger not wearing the seat belt properly even after the reminder, limits the vehicle speed of the vehicle 100. The seat belt wearing encouragement apparatus 1 includes a wearing state detecting unit 10, a vehicle speed detecting unit 14, an accelerator pedal detecting unit 15, an ECU (Electronic Control Unit) 20, and a warning unit 30.

The wearing state detecting unit 10 detects a wearing state of a seat belt by a passenger of the vehicle 100 who is to be restrained. The wearing state detecting unit 10 includes, for example, at least one sensor to detect the wearing state of the seat belt. The wearing state detecting unit 10 includes, for example, a seating detecting unit 11, an extension detecting unit 12, and an engagement detecting unit 13.

The seating detecting unit 11 detects seating of a passenger of the vehicle 100, and outputs a seating detection signal representing whether the passenger is seated. The seating detecting unit 11 is a seating sensor that is, for example, built in a seating portion of a seat seated by the passenger, to detect whether the passenger is seated on the seat.

The extension detecting unit 12 detects extension of the seat belt which restrains the passenger of the vehicle 100, and outputs an extension detection signal representing whether the seat belt is extended. The extension detecting unit 12 is a payout sensor that is, for example, built in a retractor that winds up the seat belt, to detect the seat belt being extended out of the retractor.

The engagement detecting unit 13 detects engagement of a tongue attached to the seat belt restraining the passenger of the vehicle 100, and a buckle attached to the seat, and outputs an engagement detection signal representing whether the tongue and the buckle are engaged. The engagement detecting unit 13 is, for example, a buckle sensor (a buckle switch) that is built in the buckle, to detect the tongue and the buckle being engaged. The tongue is a part slidably attached to the seat belt. The buckle is a part to which the tongue can be attached and detached. The buckle is fixed, for example, on a lower part of the seat, or on the floor of the vehicle compartment.

The vehicle speed detecting unit 14 detects the speed of the vehicle 100 (may be referred to as the "vehicle speed V", below), and outputs a vehicle speed detection signal representing a value of the vehicle speed V. The vehicle speed detecting unit 14 is, for example, a vehicle speed sensor to detect the value of the vehicle speed V.

The accelerator pedal detecting unit 15 detects an operational amount of the accelerator pedal performed by the passenger of the vehicle 100, and outputs the operational amount detection signal representing the operational amount of the accelerator pedal. The accelerator pedal detecting unit 15 is, for example, an accelerator pedal sensor to detect the operational amount of the accelerator pedal arranged at the feet of the driver's seat of the vehicle 100.

The seating detecting unit 11, the extension detecting unit 12, the engagement detecting unit 13, the vehicle speed detecting unit 14, and the accelerator pedal detecting unit 15 are connected to the ECU 20, for example, via an in-vehicle network such as a CAN (Controller Area Network).

The ECU 20 is an example of a control unit to execute determination of seat belt wearing and vehicle speed limiting control to limit the vehicle speed V. The ECU 20 is an electrical control unit that includes a wearing determination unit 21, a warning command unit 22, a vehicle speed limiting unit 23, and a warning timer 24. The ECU 20 includes a processor such as a CPU (Central Processing Unit), and a memory. Functions of the wearing determination unit 21, the warning command unit 22, and the vehicle speed limiting unit 23 are implemented by a program processed by the processor. The program for implementing these functions is stored in the memory. The ECU 20 may be implemented by a configuration in which multiple ECUs are connected to be capable of communicating with each other.

<Wearing Determination>

The wearing determination unit 21 executes determination of seat belt wearing based on a wearing state detected by the wearing state detecting unit 10. Specifically, the wearing determination unit 21 determines whether the seat belt is in a state of not being worn properly. The state of the seat belt not being worn properly represents a state of the seat belt being worn improperly (an improperly worn state), or a state of the seat belt not being worn (an unworn state). States that are not the state of the seat belt not being worn properly include a state of the seat belt worn properly (a properly worn state that is not the improperly worn state and not the unworn state).

FIG. 2 is a diagram illustrating a list of combinations of states detected by the wearing state detecting unit 10. In a row of "passenger detection", "on" represents a state in which seating of the passenger is detected by the seating detecting unit 11, and "off" represents a state in which seating of the passenger is not detected by the seating detecting unit 11. In a row of "belt extension", "on" represents a state in which extension of the seat belt is detected by the extension detecting unit 12, and "off" represents a state in which extension of the seat belt is not detected by the extension detecting unit 12. In a row of "buckle", "on" represents a state in which engagement between the tongue and the buckle is detected by the engagement detecting unit 13, and "off" represents a state in which engagement between the tongue and the buckle is not detected by the engagement detecting unit 13. In a row of "vehicle speed flag", "0" represents a state in which the vehicle speed V less than or equal to a predetermined positive setting speed Vs is detected by the vehicle speed detecting unit 14; "1" represents a state in which the vehicle speed V exceeding the setting speed Vs is detected by the vehicle speed detecting unit 14; and "-" represents that the vehicle speed V is not relevant.

The wearing determination unit 21 determines a value of a condition flag Fc representing a combination of the detection states, based on states detected by the seating detecting unit 11, the extension detecting unit 12, and the engagement detecting unit 13. For example, the wearing determination unit 21 sets the condition flag Fc to 7 if the passenger detection is on, the belt extension is on, and the buckle is on; or sets the condition flag Fc to 0 if the passenger detection is off, the belt extension is off, and the buckle is off. The other combinations of detection states similarly determine the respective values of the condition flag Fc.

The wearing determination unit 21 determines that wearing of the seat belt is in an unworn state if the condition flag Fc is 1. This is because the state in which the passenger detection is on, and the belt extension and the buckle are off may be inferred such that the passenger is in the middle of trying to put on the seat belt. The wearing determination unit 21 determines that wearing of the seat belt is in an unworn state if the condition flag Fc is 2, and the vehicle speed flag is 0. This is because the state in which the passenger detection and the belt extension are on, the buckle is off, and the vehicle speed V is less than or equal to the setting speed Vs, may be inferred such that the passenger is in the middle of trying to put on the seat belt.

The wearing determination unit 21 determines that wearing of the seat belt is in an improperly worn state if the condition flag Fc is 3. This is because the state in which the passenger detection and the buckle are on, and the belt extension is off, may be inferred such that the passenger is pretending to wear the seat belt by some unlawful measures. The wearing determination unit 21 determines that wearing of the seat belt is in an improperly worn state if the condition flag Fc is 2, and the vehicle speed flag is 1. This is because the state in which the passenger detection and the belt extension are on, the buckle is off, and the vehicle speed V exceeds the setting speed Vs, may be inferred such that the passenger has taken off the seat belt in a comparatively high vehicle speed range.

If having determined that wearing of the seat belt is to be in an improperly worn state, the wearing determination unit 21 sets an improper wearing flag Fd representing whether wearing of the seat belt is determined to be in an improperly worn state, to 1. The improper wearing flag Fd being 0 represents a state in which wearing of the seat belt is not determined to be in an improperly worn state; and the improper wearing flag Fd being 1 represents a state in which wearing of the seat belt is determined to be in an improperly worn state.

Also, the wearing determination unit 21 determines whether a proper or improper procedure has been taken for putting on the seat belt, based on a timing at which seating was detected by the seating detecting unit 11, a timing at which extension was detected by the extension detecting unit 12, and a timing at which engagement was detected by the engagement detecting unit 13. If having determined that the seat belt has been put on in accordance with the proper procedure, the wearing determination unit 21 determines that the seat belt is being worn properly. On the other hand, if having determined that the seat belt has not been put on in accordance with the proper procedure, the wearing determination unit 21 determines that the seat belt is not being worn properly.

The wearing determination unit 21 determines that the seat belt has not been put on in accordance with the proper procedure, if a detection state previous to a state in which seating and engagement are detected, is a state in which the seating was not detected and at least one of the extension and the engagement was detected. In other words, the wearing determination unit 21 determines that wearing of the seat belt is in an improperly worn state, if the state previous to a state having the condition flag Fc set to 7, has the condition flag Fc set to either one of 4, 5, or 6. This is because the seating being detected after at least one of the extension and the engagement has been detected, may be inferred such that the passenger is pretending to wear the seat belt by some unlawful measures.

The wearing determination unit 21 also determines that the seat belt has not been put on in accordance with the proper procedure, if a detection state previous to a state in which seating, extension, and engagement are detected, is a state in which the extension was not detected, and the seating and the engagement were detected. In other words, the wearing determination unit 21 determines that wearing of the seat belt is in an improperly worn state, if the state previous to a state having the condition flag Fc set to 7, has the condition flag Fc set to 3. This is because the extension being detected after the seating and the engagement have been detected, may be inferred such that the passenger is pretending to wear the seat belt by some unlawful measures.

In this way, the wearing determination unit 21 determines that wearing of the seat belt is in an improperly worn state, if the state previous to a state having the condition flag Fc is set to a value other than 0-2 and 7 (e.g., set to either one of 3 to 6 in the case of FIG. 2). If having determined that wearing of the seat belt is in an improperly worn state, the wearing determination unit 21 sets the improper wearing flag Fd to 1, as described above.

<Vehicle Speed Limiting Control>

In FIG. 1, the vehicle speed limiting unit 23 executes controlling to limit the vehicle speed V (vehicle speed limiting control). The vehicle speed limiting unit 23 starts the vehicle speed limiting control, if the vehicle speed detecting unit 14 has detected the vehicle speed V exceeding the setting speed Vs, and if the wearing determination unit 21 has determined that the seat belt of the driver, who is a passenger of the vehicle 100, does not wear the seat belt properly, then, a predetermined condition is satisfied. For example, the vehicle speed limiting unit 23 limits the vehicle speed V to be less than or equal to an upper speed limit Vu, if the vehicle speed V exceeding the setting speed Vs has been detected, and the seat belt of the driver has been determined as not being worn properly, and even after an allowed time Tp has elapsed, the improperly worn state continues.

Figure 3:
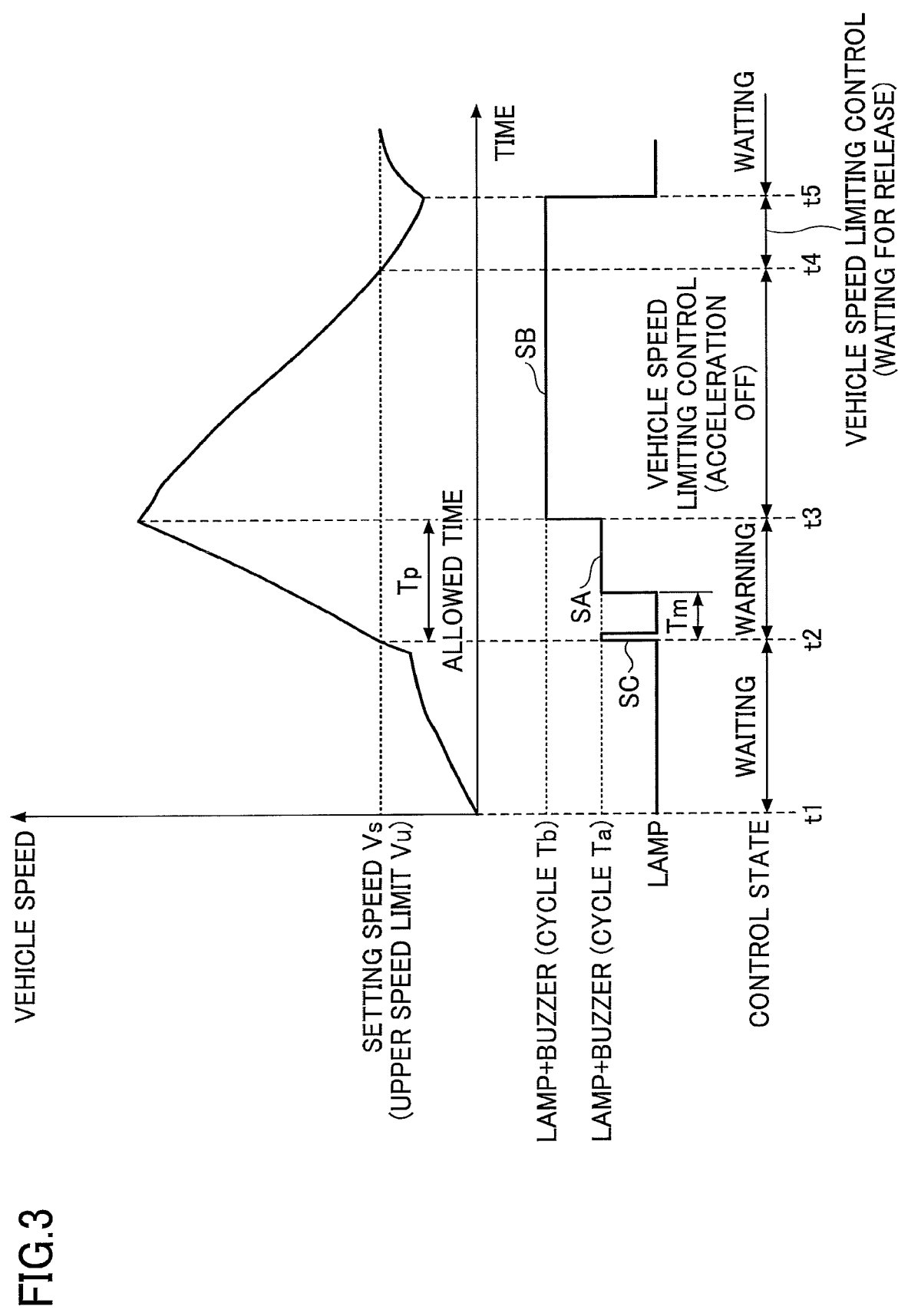
FIG. 3 is a timing chart illustrating an example of control operations of a seat belt wearing encouragement apparatus in a situation where the vehicle speed rises from zero while the seat belt is not properly worn.
Figure 4:
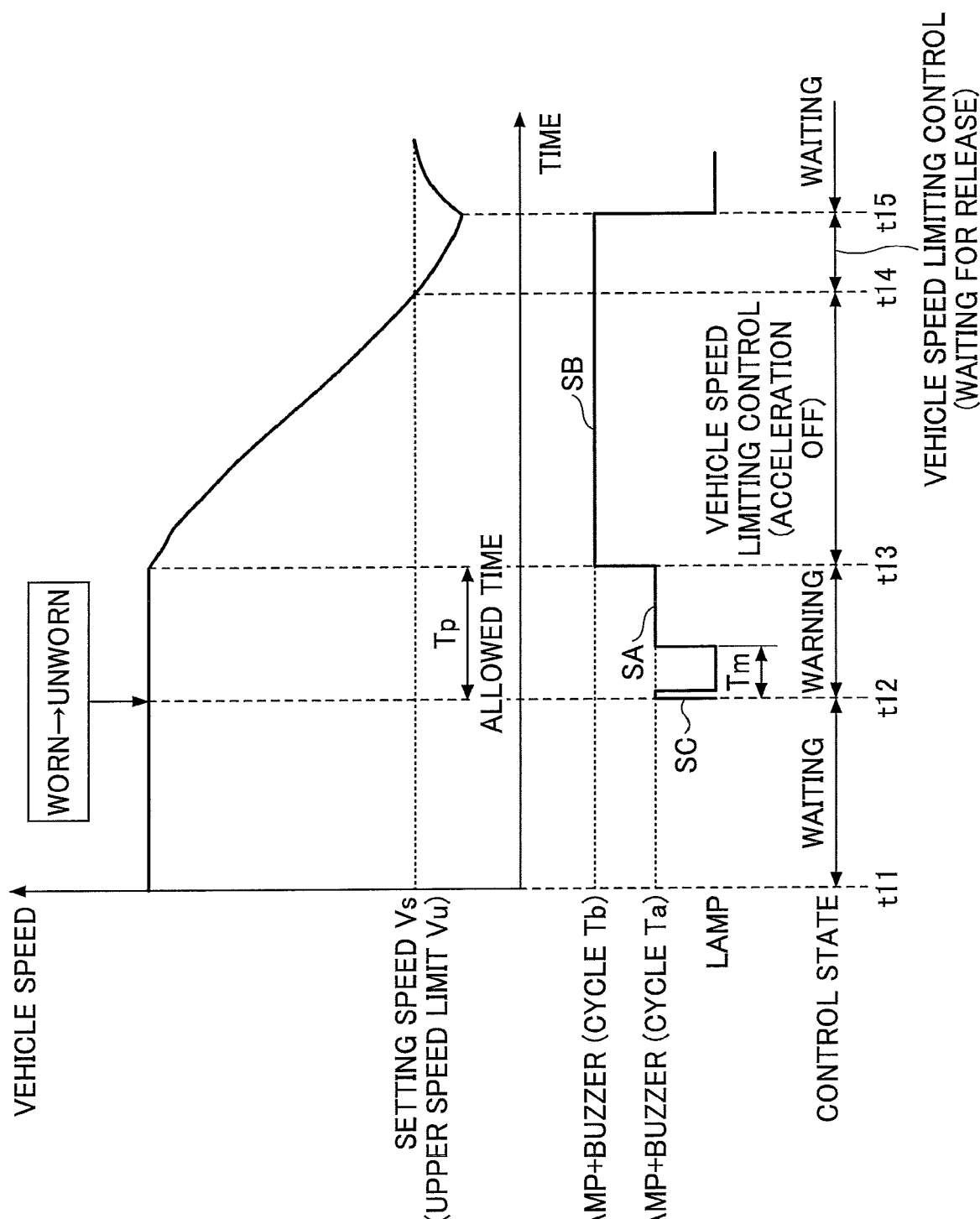
FIG. 4 is a timing chart illustrating an example of control operations of a seat belt wearing encouragement apparatus in a situation where the seat belt transitions from a worn state to an unworn state while the vehicle is traveling.

FIG. 3 is a timing chart illustrating an example of control operations of the seat belt wearing encouragement apparatus 1 in a situation where the vehicle speed rises from zero while the seat belt is not properly worn. FIG. 4 is a timing chart illustrating an example of control operations of the seat belt wearing encouragement apparatus 1 in a situation where the seat belt transitions from a worn state to an unworn state while the vehicle is traveling. In the examples in FIG. 3 and FIG. 4, the setting speed Vs and the upper speed limit Vu are set to the same values, respectively.

Next, with reference to FIG. 3 and FIG. 4, an example of the vehicle speed limiting control will be described as executed by the vehicle speed limiting unit 23 illustrated in FIG. 1.

For example, the vehicle speed limiting unit 23 limits reception of an accelerator pedal operation performed by the driver, to execute the vehicle speed limiting control to limit acceleration of the vehicle 100. Limiting acceleration of the vehicle 100 decelerates the vehicle 100, and decreases the vehicle speed V.

The vehicle speed limiting unit 23 sets a control state flag S to "standby", if the vehicle speed detecting unit 14 has detected the vehicle speed V to be less than or equal to the setting speed Vs, and the wearing determination unit 21 has not determined that the seat belt of the driver is not being worn properly. Here, "the wearing determination unit 21 has not determined that the seat belt of the driver is not being worn properly" corresponds to a case, for example, that the wearing determination unit 21 has determined that the seat belt of the driver is being worn properly. For example, during a period t11-t12 in FIG. 4, the vehicle speed limiting unit 23 sets the control state flag S to "standby".

The control state flag S represents a control state of the vehicle speed limiting control. If the control state flag S is set to "standby", the vehicle speed limiting control is not executed by the vehicle speed limiting unit 23.

The vehicle speed limiting unit 23 sets the control state flag S to "standby", if the vehicle speed detecting unit 14 has detected the vehicle speed V to be less than or equal to the setting speed Vs, and the wearing determination unit 21 has determined that the seat belt of the driver is not being worn properly. For example, during a period t1-t2 in FIG. 3, the vehicle speed limiting unit 23 sets the control state flag S to "standby".

The vehicle speed limiting unit 23 sets the control state flag S to "warning", if the vehicle speed V exceeding the setting speed Vs is detected by the vehicle speed detecting unit 14, and the wearing determination unit 21 has determined that the seat belt of the driver is not worn properly. For example, during a period t2-t3 in FIG. 3, the vehicle speed limiting unit 23 sets the control state flag S to "warning". For example, during a period t12-t13 in FIG. 4, the vehicle speed limiting unit 23 sets the control state flag S to "warning".

Upon setting the control state flag S to "warning", the vehicle speed limiting unit 23 issues a command to the warning timer 24 (see FIG. 1) to start a countdown. In response to receiving the countdown command, the warning timer 24 sets the allowed time Tp specified in advance as the initial value, and starts the countdown from the initial value. Note that the vehicle speed limiting unit 23 resets the counter of the warning timer 24 when the control state flag S transitions from "warning" to another flag condition.

The vehicle speed limiting unit 23 releases limiting the vehicle speed V, if no occurrence of determination that the seat belt is not being worn properly holds until (for example, an occurrence of determination that the seat belt is being worn properly happens before) the allowed time Tp elapses. In other words, if no occurrence of determination that the seat belt is not being worn properly holds until the counter value of the warning timer 24 reaches 0, the vehicle speed limiting unit 23 releases limiting the vehicle speed V, and sets the control state flag S to "standby". In short, the vehicle speed limiting unit 23 makes the control state flag S transition from "warning" to "standby". As such, it is possible to avoid limiting the vehicle speed before limiting of the vehicle speed has started, and hence, it is possible to reduce troublesomeness felt by the passenger due to the limited vehicle speed.

Alternatively, the vehicle speed limiting unit 23 releases limiting the vehicle speed V, if an occurrence of detection made by the vehicle speed detecting unit 14 that the vehicle speed V is less than or equal to the setting speed Vs, happens before the allowed time Tp elapses. In other words, if an occurrence of detection made by the vehicle speed detecting unit 14 that the vehicle speed V is less than or equal to the setting speed Vs, happens before the counter value of the warning timer 24 reaches 0, the vehicle speed limiting unit 23 releases limiting the vehicle speed V, and sets the control state flag S to "standby". In short, the vehicle speed limiting unit 23 makes the control state flag S transition from "warning" to "standby". As such, it is possible to avoid limiting the vehicle speed before limiting of the vehicle speed has started, and hence, it is possible to reduce troublesomeness felt by the passenger due to the limited vehicle speed.

The vehicle speed limiting unit 23 sets the control state flag S to "acceleration off" if no occurrence of determination that the seat belt is not being worn properly does not hold until the allowed time Tp elapses. Alternatively, the vehicle speed limiting unit 23 sets the control state flag S to "acceleration off" if an occurrence of detection made by the vehicle speed detecting unit 14 that the vehicle speed V is less than or equal to the setting speed Vs, does not happen before the predetermined time elapses.

For example, during a period t3-t4 in FIG. 3, the vehicle speed limiting unit 23 sets the control state flag S to "acceleration off". For example, during a period t13-t14 in FIG. 4, the vehicle speed limiting unit 23 sets the control state flag S to "acceleration off".

If the control state flag S is "acceleration off", the vehicle speed limiting unit 23 forcibly inhibits receiving an accelerator pedal operation performed by the driver, to execute the vehicle speed limiting control to limit acceleration of the vehicle 100. In other words, the control state flag S being "acceleration off" represents the vehicle speed V being limited.

The vehicle speed limiting unit 23 determines whether an accelerator pedal operation has been performed by the driver, based on the operational amount detection signal from the accelerator pedal detecting unit 15 (see FIG. 1). The vehicle speed limiting unit 23 determines that there is no accelerator pedal operation performed by the driver if the operational amount of the accelerator pedal is less than or equal to a setting operational amount P (for example, zero or a value slightly greater than zero). On the other hand, the vehicle speed limiting unit 23 determines that there is an accelerator pedal operation performed by the driver if the operational amount of the accelerator pedal exceeds the setting operational amount P.

The vehicle speed limiting unit 23 makes the control state flag S transition from "acceleration off" to "waiting for release" if the vehicle speed V to be less than or equal to the setting speed Vs is detected while the determination continues that the seat belt of the driver is determined not worn properly, and that there is an accelerator pedal operation performed by the driver. The vehicle speed limiting unit 23 releases limiting the vehicle speed V, and makes the control state flag S transition from "waiting for release" to "standby" if a determination is made that there is no accelerator pedal operation performed by the driver.

A state in which the control state flag S is set to "waiting for release" (for example, a period t4-t5 in FIG. 3 or a period t14-t15 in FIG. 4) represents a state in which the vehicle speed limiting control is not released as the driver is stepping on the accelerator pedal. Also in the case of the control state flag S being "waiting for release", the vehicle speed limiting unit 23 forcibly inhibits receiving an accelerator pedal operation performed by the driver, to execute the vehicle speed limiting control to limit acceleration of the vehicle 100. In other words, the control state flag S being "waiting for release" also represents the vehicle speed V being limited.

Note that while the seat belt of the driver is determined as not being worn properly and an accelerator pedal operation performed by the driver is determined, the vehicle speed V may decrease less than or equal to the setting speed Vs. In this case, the vehicle speed limiting unit 23 releases limiting the vehicle speed V, and makes the control state flag S transition from the "acceleration off" to "standby".

Also, while the seat belt of the driver is determined as not being worn properly and an accelerator pedal operation performed by the driver is determined, there may be a case where no occurrence of determination that the seat belt is not being worn properly holds. For example, while the determination continues that the seat belt of the driver is determined as not being worn properly, and an accelerator pedal operation performed by the driver is determined, there may be a case where an occurrence of determination that the seat belt is being worn properly happens. In this case, the vehicle speed limiting unit 23 makes the control state flag S transition from the "acceleration off" to "waiting for release". If a determination is made that no accelerator pedal operation is performed by the driver, the vehicle speed limiting unit 23 releases limiting the vehicle speed V, and makes the control state flag S transition from "waiting for release" to "standby".

<Warning Control>

In FIG. 1, the warning command unit 22 issues a command to the warning unit 30 to warn the passenger of the vehicle 100. The warning unit 30 warns the passenger of the vehicle 100, based on the command from the warning command unit 22. Specific examples or components of the warning unit 30 include a display, a warning lamp, a warning buzzer, and a speaker. The display is an example of a display unit.

Figure 5:
FIG. 5 is a diagram illustrating examples of warning displays displayed by a warning unit.
Figure 5:
Figure 5:
Figure 5:
Figure 5:
Figure 5:
Figure 5:
Figure 5:
Figure 5:
Figure 5:

Next, with reference to FIGS. 3, 4, and 5, an example of warning control executed by the warning command unit 22 illustrated in FIG. 1 will be described. FIG. 5 is a diagram illustrating examples of warning displays displayed by the warning unit 30.

If the control state flag S is "standby", and the wearing determination unit 21 has not determined that the seat belt of the driver is not being worn properly, the warning command unit 22 issues a command to the warning unit 30 to display a blank display B. Accordingly, no warning display is displayed on the display of the warning unit 30. Note that the control state flag S being "standby" happens, for example, during a period t11-t12 in FIG. 4. Also, a case where the wearing determination unit 21 has not determined that the seat belt of the driver is not being worn properly is, for example, a case where the wearing determination unit 21 has determined that the seat belt of the driver is being worn properly.

Also, if the control state flag S is "standby", and the wearing determination unit 21 has not determined that the seat belt of the driver is not being worn properly, the warning command unit 22 issues a command to the warning unit 30 to turn off a warning lamp. Accordingly, the warning lamp of the warning unit 30 is turned off (see the blank display B in FIG. 5). Note that the control state flag S being "standby" happens, for example, during a period t11-t12 in FIG. 4. Also, a case where the wearing determination unit 21 has not determined that the seat belt of the driver is not being worn properly is, for example, a case where the wearing determination unit 21 has determined that the seat belt of the driver is being worn properly.

If the control state flag S is "standby" (for example, the period t1-t2 in FIG. 3), and the wearing determination unit 21 has determined that wearing of the seat belt is in an unworn state, the warning command unit 22 issues a command to the warning unit 30 to provide a warning by a warning display A. Accordingly, the warning display A is displayed on the display of the warning unit 30. The warning unit 30 warns the driver, for example, by the warning display A meaning that "Maximum speed is going to be limited to AA km/h. Wear the seat belt." where "AA" displays a speed value set as the upper speed limit Vu.

If the control state flag S is "standby" (for example, the period t1-t2 in FIG. 3), and the wearing determination unit 21 has determined that wearing of the seat belt is in an improperly worn state, the warning command unit 22 issues a command to the warning unit 30 to provide a warning by a warning display C. Accordingly, the warning display C is displayed on the display of the warning unit 30. The warning unit 30 warns the driver, for example, by the warning display C meaning that "The seat belt is worn improperly. Wear the seat belt properly".

Also, if the control state flag S is "standby" (for example, the period t1-t2 in FIG. 3), and the wearing determination unit 21 has determined that wearing of the seat belt is in an improperly worn state, the warning command unit 22 issues a command to turn on the warning lamp. Accordingly, the warning lamp of the warning unit 30 is turned on (see the warning display C in FIG. 5).

If the control state flag S is "warning" (for example, the period t2-t3 in FIG. 3 or the period t12-t13 in FIG. 4), the warning command unit 22 issues a command to provide a warning by a warning display D. Accordingly, the warning display D is displayed on the display of the warning unit 30. The warning unit 30 warns the driver, for example, by the warning display D meaning that "Maximum speed is going to be limited to AA km/h within BB seconds. Wear the seat belt." where "AA" displays a speed value set as the upper speed limit Vu, and "BB" displays a value set as the allowed time Tp.

In this way, the warning unit 30 displays the upper speed limit Vu (AA km/h in the case of the warning display D) on the display when the control state flag S transitions to "warning" and the allowed time Tp starts elapsing. Displaying the upper speed limit Vu when the allowed time Tp starts elapsing enables the driver to visually recognize what upper speed limit Vu will be imposed when limiting the vehicle speed V becomes effective. In other words, the passenger can visually confirm the upper speed limit Vu to be imposed when limiting the vehicle speed V would become effective, before limiting of the vehicle speed V starts.

Also, the warning unit 30 starts displaying the remaining time until limiting the vehicle speed V becomes effective (BB seconds in the case of the warning display D) on the display, when the control state flag S transitions to "warning" and the allowed time Tp starts elapsing. Displaying the remaining time when the allowed time Tp starts elapsing enables the driver to visually recognize how much time is left until limiting the vehicle speed V becomes effective. In other words, the driver can visually confirm the time until the vehicle speed V is going to be limited.

When the control state flag S is set to "warning", the warning command unit 22 starts displaying the counter value of the warning timer 24. Therefore, while the control state flag S is "warning" (for example, the period t2-t3 in FIG. 3 or the period t12-t13 in FIG. 4), the warning unit 30 can display a countdown of the remaining time (BB seconds in the case of the warning display D) until limiting the vehicle speed V becomes effective.

If the control state flag S is other than "warning", or the counter value of the warning timer 24 is 0, the warning command unit 22 issues a command to the warning unit 30 to turn off the display so that the warning unit 30 can turn off the display of the remaining time.

Also, if the control state flag S is "warning", the warning command unit 22 issues a command to the warning unit 30 to blink the warning lamp by a cycle Ta along with a warning beep SA. Accordingly, the warning buzzer of the warning unit 30 outputs the warning beep SA continuously or by the cycle Ta, and the warning lamp of the warning unit 30 blinks by the cycle Ta (see the warning-display D in FIG. 5).

If the control state flag S is "acceleration off" (for example, the period t3-t4 in FIG. 3 or the period t13-t14 in FIG. 4), the warning command unit 22 issues a command to the warning unit 30 to provide a warning by a warning display E. Accordingly, the warning display E is displayed on the display of the warning unit 30. The warning unit 30 warns the driver, for example, by the warning display E meaning that "Maximum speed is going to be AA km/h. Wear the seat belt." where "AA" displays a speed value set as the upper speed limit Vu.

Also, if the control state flag S is "acceleration off", the warning command unit 22 issues a command to the warning unit 30 to blink the warning lamp by a cycle Tb along with a warning beep SB. Accordingly, the warning buzzer of the warning unit 30 outputs the warning beep SB continuously or by the cycle Tb, and the warning lamp of the warning unit 30 blinks by the cycle Tb (see the warning-display E in FIG. 5).

Setting the cycle Tb shorter than the cycle Ta changes the output cycle of the warning beep and the blink cycle of the warning lamp. This makes it easier for the passenger to recognize that the vehicle speed limiting control has started.

If the control state flag S is "waiting for release" (for example, the period t4-t5 in FIG. 3 or the period t14-t15 in FIG. 4), the warning command unit 22 issues a command to the warning unit 30 to provide a warning by a warning display F. Accordingly, the warning display F is displayed on the display of the warning unit 30. The warning unit 30 warns the driver, for example, by the warning display E meaning that "Release the accelerator pedal in order to release limiting the vehicle speed".

Also, if the control state flag S is "waiting for release", the warning command unit 22 issues a command to the warning unit 30 to blink the warning lamp by the cycle Tb along with the warning beep SB. Accordingly, the warning buzzer of the warning unit 30 outputs the warning beep SB continuously or by the cycle Tb, and the warning lamp of the warning unit 30 blinks by the cycle Tb (see the warning-display F in FIG. 5).

<Interlock Control>

Figure 6:
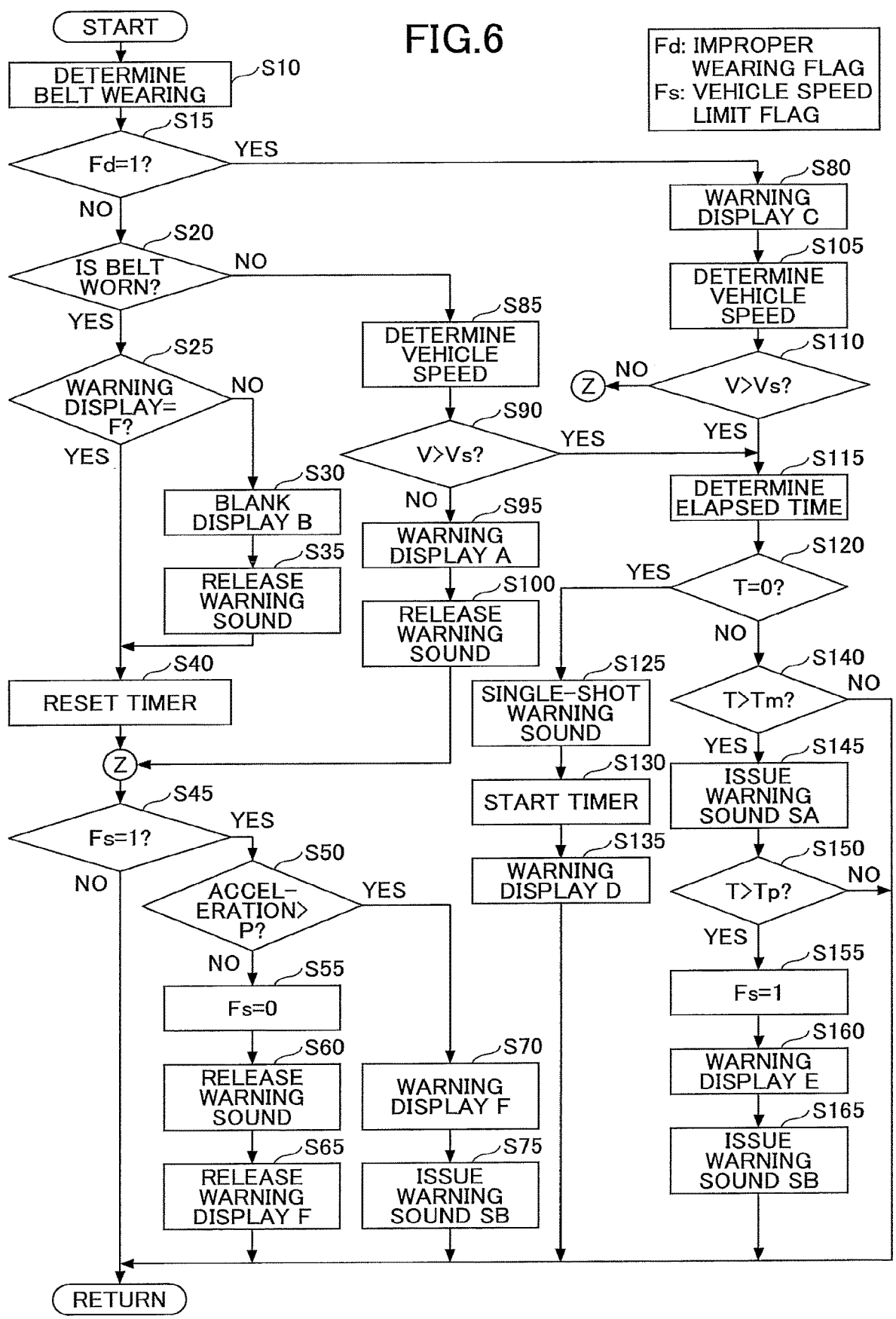
FIG. 6 is a flowchart illustrating an example of a flow of an interlock control process executed by a seat belt wearing encouragement apparatus.

FIG. 6 is a flowchart illustrating an example of a flow of an interlock control process executed by the seat belt wearing encouragement apparatus 1. The interlock control includes the wearing determination, the vehicle speed limiting control, and the warning control described above. The ECU 20 of the seat belt wearing encouragement apparatus 1 illustrated in FIG. 1 starts the interlock control in response to detection of a door of the vehicle 100 transitioning to an open state. Even before the ignition switch is turned on, the wearing determination unit 21 of the ECU 20 may determine whether the seat belt is worn, based on the wearing state detected by the wearing state detecting unit 10. In the interlock control, a series of steps from START to END are executed periodically by the ECU 20.

At Step S10, the wearing determination unit 21 determines whether the seat belt is being worn, based on the wearing state detected by the wearing state detecting unit 10.

At Step S15, the wearing determination unit 21 determines whether the improper wearing flag Fd is 1. As described above, the improper wearing flag Fd being 0 represents a state in which wearing of the seat belt is not determined as an improperly worn state (for example, an unworn state or a properly worn state), and the improper wearing flag Fd being 1 represents a state in which wearing of the seat belt is determined as an improperly worn state. If the wearing determination unit 21 has determined that the improper wearing flag Fd is 1 (YES at step S15), Step S80 is executed.

At Step S80, the warning command unit 22 issues a command to the warning unit 30 to warn the passenger by the warning display C (see FIG. 5). Accordingly, the warning unit 30 displays the warning display C.

At Step S105, the vehicle speed limiting unit 23 executes a vehicle speed determination to compare the vehicle speed V detected by the vehicle speed detecting unit 14 with the setting speed Vs. If the vehicle speed V does not exceed the setting speed Vs, Step S45 is executed. If the vehicle speed V exceeds the setting speed Vs, Step S115 is executed.

At Step S115, the vehicle speed limiting unit 23 determines an elapsed time T. If the vehicle speed limiting unit 23 has determined that the elapsed time T is zero (YES at step S120), the warning command unit 22 issues a command to the warning unit 30 to warn the passenger by a single-shot warning beep SC (see FIGS. 3-4) (Step S125). Accordingly, the single-shot warning beep SC is output from the warning unit 30.

At Step S130, the vehicle speed limiting unit 23 issues a command to the warning timer 24 (see FIG. 1) to start a countdown.

At Step S135, the warning command unit 22 issues a command to the warning unit 30 to warn the passenger by the warning display D (see FIG. 5). Accordingly, the warning unit 30 displays the warning display D.

On the other hand, if the vehicle speed limiting unit 23 has determined at Step S120 that the elapsed time T is not zero (NO at step S120), Step S140 is executed.

If the vehicle speed limiting unit 23 has determined at Step S140 that the elapsed time T exceeds an intermediate setting time Tm (YES at step S140), Step S145 is executed. The intermediate setting time Tm is a time shorter than the allowed time Tp (see FIGS. 3-4).

At Step S145, the warning command unit 22 issues a command to the warning unit 30 to warn the passenger by the warning beep SA (Step S145). Accordingly, the warning unit 30 sounds the warning beep SA (see FIGS. 3-4).

If the vehicle speed limiting unit 23 has determined at Step S150 that the elapsed time T exceeds the allowed time Tp (YES at Step S150), Step S155 is executed.

At Step S155, the vehicle speed limiting unit 23 sets the vehicle speed limit flag Fs to 1, and starts the vehicle speed limiting control (Step S155). The vehicle speed limit flag Fs being 1 represents a state in which the control state flag S is set to "acceleration off" or "waiting for release".

At Step S160, the warning command unit 22 issues a command to the warning unit 30 to warn the passenger by the warning display E (see FIG. 5). Accordingly, the warning unit 30 displays the warning display E.

At Step S165, the warning command unit 22 issues a command to the warning unit 30 to warn the passenger by the warning beep SB. Accordingly, the warning unit 30 sounds the warning beep SB (see FIGS. 3-4).

On the other hand, if the wearing determination unit 21 has determined at Step S15 that the improper wearing flag Fd is 0 (for example, wearing of the seat belt is in an unworn state or a properly worn state) (NO at Step S15), Step S20 is executed.

At Step S20, the wearing determination unit 21 determines whether the seat belt is being worn. If the seat belt is determined as not being worn (for example, an unworn state), Step S85 is executed.

At Step S85, the vehicle speed limiting unit 23 executes a vehicle speed determination to compare the vehicle speed V detected by the vehicle speed detecting unit 14 with the setting speed Vs. If the vehicle speed V exceeds the setting speed Vs (YES at Step S90), Step S115 is executed. On the other hand, if the vehicle speed V does not exceed the setting speed Vs (NO at Step S90), Step S95 is executed.

At Step S95, the warning command unit 22 issues a command to the warning unit 30 to warn the passenger by the warning display A (see FIG. 5). Accordingly, the warning unit 30 displays the warning display A, for example, during the period t1-t2 in FIG. 3. At Step S100, the warning command unit 22 issues a command to the warning unit 30 not to output the warning beep. Accordingly, the warning beep is not output any longer from the warning unit 30, for example, during the period t1-t2 in FIG. 3.

On the other hand, if the wearing determination unit 21 has determined at Step S20 that the seat belt is being worn (for example, a properly worn state), Step S25 is executed.

At Step S25, the warning command unit 22 determines whether a command is issued to the warning unit 30 to warn the passenger by the warning display F (see FIG. 5). If a command is not issued to the warning unit 30 to warn the passenger by the warning display F, Step S40 is executed; or if a command is issued to the warning unit 30 to warn the passenger by the warning display F, Step S30 is executed.

At Step S30, the warning command unit 22 issues a command to the warning unit 30 to display the blank display B. Accordingly, no warning display is displayed on the display of the warning unit 30, for example, during the period t11-t12 in FIG. 4. At Step S35, the warning command unit 22 issues a command to the warning unit 30 not to output the warning beep. Accordingly, the warning beep is not output any longer from the warning unit 30, for example, during the period t11-t12 in FIG. 4.

At Step S40, the vehicle speed limiting unit 23 resets the counter of the warning timer 24.

At Step S45, the vehicle speed limiting unit 23 determines whether the vehicle speed limit flag Fs is 1. If the vehicle speed limit flag Fs is 1, Step S50 is executed.

At Step S50, the vehicle speed limiting unit 23 determines whether the operational amount of the accelerator pedal detected by the accelerator pedal detecting unit 15 exceeds the setting operational amount P. The setting operational amount P is set to zero or a value slightly greater value than zero. If the operational amount does not exceed the setting operational amount P, Step S55 is executed; or if the operational amount exceeds the setting operational amount P, Step S70 is executed.

An operational amount exceeding the setting operational amount (YES at Step S50) represents that there is an accelerator pedal operation by the driver. In this case, at Step S70, the warning command unit 22 issues a command to the warning unit 30 to warn the passenger by the warning display F (see FIG. 5). Accordingly, the warning unit 30 displays the warning display F. At Step S75, the warning command unit 22 issues a command to the warning unit 30 to warn the passenger by the warning beep SB. Accordingly, the warning unit 30 sounds the warning beep SB (see FIGS. 3-4).

On the other hand, an operational amount not exceeding the setting operational amount (NO at Step S50) represents that there is no accelerator pedal operation by the driver. In this case, at Step S50, the vehicle speed limiting unit 23 sets the vehicle speed limit flag Fs to zero. Accordingly, the vehicle speed limiting control is released. At Step S60, the warning command unit 22 issues a command to the warning unit 30 to release the warning beep and the warning display F (Steps S60 and S65). Accordingly, the warning beep and the warning display F are not output from the warning unit 30.

As above, a seat belt wearing encouragement apparatus has been described with the embodiments. Note that the present invention is not limited to the above embodiments. Various modifications and improvements can be made within the scope of the present invention, by combining and/or replacing a part of or all of the embodiments with the others.

For example, in the embodiments, the wearing determination unit 21 determines whether the seat belt is in a state of not being worn properly. However, as a modified example ex1 of the embodiments, the wearing determination unit 21 may determine whether the seat belt is in a state of not being worn. A state of the seat belt not being worn represents an unworn state in a literal sense. On the other hand, a state that is not a state of the seat belt not being worn represents a state of the seat belt worn (a worn state) irrespective of whether the seat belt is being worn properly or improperly.

In the modified example ex1, if the vehicle speed detecting unit 14 has detected the vehicle speed V exceeding the setting speed Vs, and the wearing determination unit 21 has determined that the seat belt is not being worn, the warning command unit 22 issues a command to the warning unit 30 to warn the passenger. If the wearing determination unit 21 continues to determine that the seat belt is not being worn even after a predetermined allowed time Tp has elapsed since the warning was executed, the vehicle speed limiting unit 23 limits the vehicle speed V. The vehicle speed limiting unit 23 releases limiting the vehicle speed V if no occurrence of determination made by the wearing determination unit 21 that the seat belt is not being worn, holds until the allowed time Tp elapses; an occurrence of detection made by the vehicle speed detecting unit that the vehicle speed is less than or equal to the setting speed, happens before the allowed time Tp elapses; or both the no occurrence of determination and the occurrence of detection are realized when the allowed time Tp elapses. Other than this point, the same description as in the above embodiments is applicable to the modified example ex1.

Also, in the above embodiments, the wearing state detecting unit 10 includes the seating detecting unit 11, the extension detecting unit 12, and the engagement detecting unit 13. However, as a modified example ex2 of the embodiment, the extension detecting unit 12 may be omitted.

In the modified example ex2, the wearing determination unit 21 determines whether a proper or improper procedure has been taken for putting on the seat belt, based on a timing at which seating was detected by the seating detecting unit 11, and a timing at which engagement was detected by the engagement detecting unit 13. If having determined that the seat belt has been put on in accordance with the proper procedure, the wearing determination unit 21 determines that the seat belt is being worn properly. On the other hand, if having determined that the seat belt has not been put on in accordance with the proper procedure, the wearing determination unit 21 determines that the seat belt is not being worn properly.

The wearing determination unit 21 determines that the seat belt has not been put on in accordance with the proper procedure, if a detection state previous to a state in which seating and engagement are detected, is a state in which the seating was not detected and the engagement was detected. This is because the seating being detected after the engagement has been detected, may be inferred such that the passenger is pretending to wear the seat belt by some unlawful measures.

Also, for example, the wearing state detecting unit 10 may include a camera to detect the wearing state of a seat belt. The wearing state detecting unit 10 detects at least one of seating of the passenger, extension of the seat belt, and engagement between the tongue and the buckle, based on photography information obtained by a camera.

Also, in the above embodiment, the upper speed limit Vu while the vehicle speed V is limited is set to the same speed value as the setting speed Vs that determines the starting point of the allowed time Tp. However, the upper speed limit Vu may be a higher value or a lower value than the setting speed Vs. For example, in a modified example in which the upper speed limit Vu is higher than the setting speed Vs, the vehicle speed limiting unit 23 executes the vehicle speed limiting control that permits the vehicle speed V to rise to the upper speed limit Vu as long as the vehicle speed V has not reached the upper speed limit Vu even after the allowed time Tp has elapsed.

Also, in the above embodiment, the vehicle speed limiting unit 23 limits reception of an accelerator pedal operation performed by the driver, to execute the vehicle speed limiting control to limit acceleration of the vehicle 100. However, the method of limiting the vehicle speed V to be less than or equal to the upper speed limit Vu is not limited as such. For example, the vehicle speed limiting unit 23 may receive accelerator pedal operations performed by the driver without restriction, and may control the output of the engine of the vehicle 100 so that the vehicle speed V is maintained less than or equal to the upper speed limit Vu. The vehicle speed limiting unit 23 may execute control for closing the opening of the throttle valve of the engine.

Also, the vehicle 100 is not limited to a vehicle having the engine as the only driving source for traveling, and may be, for example, a hybrid vehicle using both the engine and a motor, an electric vehicle, or a fuel cell vehicle.

The invention claimed is:

1. A seat belt wearing encouragement apparatus, comprising:
    a wearing state detecting unit configured to detect a wearing state of a seat belt for restraining a passenger of a vehicle;
    a wearing determination unit configured to determine whether the seat belt is worn property based on the wearing state detected by the wearing state detecting unit;
    a vehicle speed detecting unit configured to detect a vehicle speed of the vehicle;
    a warning unit configured to warn the passenger;
    a warning command unit configured to issue a command to the warning unit to execute warning in a case where the vehicle speed detecting unit has detected the vehicle speed exceeding a setting speed and the wearing determination unit has determined that the seat belt is not being worn properly; and
    a vehicle speed limiting unit configured to limit the vehicle speed in a case where even after a predetermined time has elapsed since the warning was executed, the wearing determination unit still determines that the seat belt is not being worn properly, wherein
    the wearing state detecting unit includes
        a seating detecting unit configured to detect seating of the passenger,
        an extension detecting unit configured to detect an extension of the seat belt, and
        an engagement detecting unit configured to detect engagement between a tongue attached to the seat belt and a buckle attached to a seat; and
    the wearing determination unit determines that the seat belt is not being worn properly in a case of having determined that the seat belt has not been put on in accordance with a proper procedure based on a timing at which the seating was detected by the seating detecting unit, a timing at which the extension was detected by the extension detecting unit, and a timing at which the engagement was detected by the engagement detecting unit.

2. The seat belt wearing encouragement apparatus as claimed in claim 1, wherein
    the wearing state detecting unit includes
        a seating detecting unit configured to detect seating of the passenger, and
        an engagement detecting unit configured to detect engagement between a tongue attached to the seat belt and a buckle attached to a seat, and
    the wearing determination unit determines that the seat belt is not being worn properly in a case where a state previous to a state in which the seating and the engagement are detected is a state in which the seating was not detected and the engagement was detected.

3. The seat belt wearing encouragement apparatus as claimed in claim 1, wherein the wearing determination unit determines that the seat belt is not being worn properly in a case where a state previous to a state in which the seating, the extension, and the engagement are detected is a state in which the seating was not detected and at least one of the extension and the engagement was detected or is a state in which the extension was not detected and the seating and the engagement were detected.

4. The seat belt wearing encouragement apparatus as claimed in claim 1, wherein the vehicle speed limiting unit releases limiting the vehicle speed in a case where at least one of an occurrence of determination made by the wearing determination unit that the seat belt is being worn properly and an occurrence of detection made by the vehicle speed detecting unit that the vehicle speed is less than or equal to the setting speed happens before the predetermined time elapses.

5. The seat belt wearing encouragement apparatus as claimed in claim 1, wherein the warning unit displays on a display unit a remaining time until limiting the vehicle speed becomes effective, before the predetermined time will have elapsed since the warning was executed.

6. The seat belt wearing encouragement apparatus as claimed in claim 1, wherein the warning unit displays on a display unit an upper speed limit to be imposed when limiting the vehicle speed becomes effective, before the predetermined time will have elapsed since the warning was executed.

7. The seat belt wearing encouragement apparatus as claimed in claim 1, wherein the vehicle speed limiting unit limits the vehicle speed by limiting reception of an accelerator pedal operation performed by the passenger.

8. The seat belt wearing encouragement apparatus as claimed in claim 7, wherein the vehicle speed limiting unit releases limiting the vehicle speed in a case where a determination is made that there is no accelerator pedal operation performed by the passenger after having limited the vehicle speed.

9. A seat belt wearing encouragement apparatus, comprising:
    a wearing state detecting unit configured to detect a wearing state of a seat belt for restraining a passenger of a vehicle;
    a wearing determination unit configured to determine whether the seat belt is worn based on the wearing state detected by the wearing state detecting unit;
    a vehicle speed detecting unit configured to detect a vehicle speed of the vehicle;
    a warning unit configured to warn the passenger;

a warning command unit configured to issue a command to the warning unit to execute warning in a case where the vehicle speed detecting unit has detected the vehicle speed exceeding a setting speed and the wearing determination unit has determined that the seat belt is not being worn; and a vehicle speed limiting unit configured to limit the vehicle speed in a case where even after a predetermined time has elapsed since the warning was executed, the wearing determination unit still determines that the seat belt is not being worn, wherein the wearing state detecting unit includes
- a seating detecting unit configured to detect seating of the passenger,
- an extension detecting unit configured to detect an extension of the seat belt, and
- an engagement detecting unit configured to detect engagement between a tongue attached to the seat belt and a buckle attached to a seat; and the wearing determination unit determines that the seat belt is not being worn properly in a case of having determined that the seat belt has not been put on in accordance with a proper procedure based on a timing at which the seating was detected by the seating detecting unit, a timing at which the extension was detected by the extension detecting unit, and a timing at which the engagement was detected by the engagement detecting unit.

10. The seat belt wearing encouragement apparatus as claimed in claim 9, wherein the vehicle speed limiting unit releases limiting the vehicle speed in a case where at least one of an occurrence of determination made by the wearing determination unit that the seat belt is worn and an occurrence of detection made by the vehicle speed detecting unit that the vehicle speed is less than or equal to the setting speed happens before the predetermined time elapses.

11. A seat belt wearing encouragement apparatus, comprising:
a plurality of sensors configured to detect a wearing state of a seat belt for restraining a passenger of a vehicle and detect a vehicle speed of the vehicle; and
circuitry configured to:
determine whether the seat belt is worn properly based on the wearing state,
issue a command to execute warning the passenger in a case where the vehicle speed exceeds a setting speed and it is determined that the seat belt is not being worn properly,
limit the vehicle speed in a case where even after a predetermined time has elapsed since the warning was executed, it is still determined that the seat belt is not being worn properly,
wherein issuing the command includes control to display a remaining time until limiting the vehicle speed becomes effective, before the predetermined time will have elapsed since the warning was executed.

12. The seat belt wearing encouragement apparatus as claimed in claim 11, wherein
the plurality of sensors are configured to detect seating of the passenger and detect engagement between a tongue attached to the seat belt and a buckle attached to a seat, and
the circuitry is configured to determine that the seat belt is not being worn properly in a case where a state previous to a state in which the seating and the engagement are detected is a state in which the seating was not detected and the engagement was detected.

13. The seat belt wearing encouragement apparatus as claimed in claim 11, wherein
the plurality of sensors are configured to detect seating of the passenger, detect an extension of the seat belt, and detect engagement between a tongue attached to the seat belt and a buckle attached to a seat, and
the circuitry is configured to determine that the seat belt is not being worn properly in a case of having determined that the seat belt has not been put on in accordance with a proper procedure based on a timing at which the seating was detected, a timing at which the extension was detected, and a timing at which the engagement was detected.

14. The seat belt wearing encouragement apparatus as claimed in claim 13, wherein the circuitry is configured to determine that the seat belt is not being worn properly in a case where a state previous to a state in which the seating, the extension, and the engagement are detected is a state in which the seating was not detected and at least one of the extension and the engagement was detected or is a state in which the extension was not detected and the seating and the engagement were detected.

15. The seat belt wearing encouragement apparatus as claimed in claim 11, wherein the circuitry is configured to release limiting the vehicle speed in a case where at least one of an occurrence of determination made the seat belt is being worn properly and an occurrence of detection made that the vehicle speed is less than or equal to the setting speed happens before the predetermined time elapses.

16. The seat belt wearing encouragement apparatus as claimed in claim 11, wherein issuing the command includes control to display an upper speed limit to be imposed when limiting the vehicle speed becomes effective, before the predetermined time will have elapsed since the warning was executed.

17. The seat belt wearing encouragement apparatus as claimed in claim 11, wherein the circuitry is configured to limit the vehicle speed by limiting reception of an accelerator pedal operation performed by the passenger.

18. The seat belt wearing encouragement apparatus as claimed in claim 17, wherein the circuitry is configured to release limiting the vehicle speed in a case where a determination is made that there is no accelerator pedal operation performed by the passenger after having limited the vehicle speed.

* * * * *